United States Patent [19]
Madau et al.

[11] Patent Number: 5,751,908
[45] Date of Patent: May 12, 1998

[54] FUZZY LOGIC OUTPUT DEFUZZIFICATION

[75] Inventors: Dinu Petre Madau, Dearborn; Lee Albert Feldkamp, Plymouth, both of Mich.

[73] Assignee: Ford Motor Company, Dearborn, Mich.

[21] Appl. No.: 599,447

[22] Filed: Jan. 19, 1996

Related U.S. Application Data

[63] Continuation of Ser. No. 172,991, Dec. 27, 1993, abandoned.

[51] Int. Cl.[6] .................................................. G06F 9/44
[52] U.S. Cl. ............................ 395/3; 395/61; 395/900
[58] Field of Search ............................ 395/3, 61, 900

[56] References Cited

U.S. PATENT DOCUMENTS

| | | | |
|---|---|---|---|
| 5,136,685 | 8/1992 | Nagazumi | 395/3 |
| 5,148,089 | 9/1992 | Adachi et al. | 395/904 |
| 5,185,849 | 2/1993 | Miyazawa et al. | 395/3 |
| 5,247,472 | 9/1993 | Nagazumi | 395/3 |
| 5,249,258 | 9/1993 | Hisano | 395/3 |
| 5,249,269 | 9/1993 | Nakao et al. | 395/900 |
| 5,261,036 | 11/1993 | Nakano | 395/61 |
| 5,261,247 | 11/1993 | Knezic et al. | 395/900 |
| 5,267,144 | 11/1993 | Yoshida et al. | 395/900 |
| 5,305,230 | 4/1994 | Matsumoto et al. | 395/906 |
| 5,401,949 | 3/1995 | Ziemacki et al. | 395/900 |
| 5,459,816 | 10/1995 | Basehore et al. | 395/900 |
| 5,519,740 | 5/1996 | Chao | 395/900 |

FOREIGN PATENT DOCUMENTS

| | | | |
|---|---|---|---|
| 64202165 | 3/1991 | Japan | 395/3 |
| 64209044 | 3/1991 | Japan | 395/3 |

OTHER PUBLICATIONS

Watanabe et al, "VLSI Fuzzy Chip Interference Accelerator Board Systems", Proc. 21st Inter. Sys: Multiple-valued Logic; 26–29 May 1991.

Primary Examiner—George B. Davis
Attorney, Agent, or Firm—Raymond L. Coppiellie; Roger L. May

[57] ABSTRACT

A microcontroller-based fuzzy logic processing module for generating control signal values in response to variable input signal values in accordance with constraints imposed by propositions or "rules" stored in memory in a standardized format. Each rule consists of one or more input conditions and an output directive. The input conditions and the output directive for a given rule are "fuzzified" by determining the degree of membership of each in fuzzy sets defined by membership functions. Fuzzy logic processing is accomplished by determining the extent to which the input conditions are satisfied by the current values of the input signals in order to develop a rule strength value, and then performing a "center-of-gravity" determination based on the rule strength values assigned to the output membership functions. The center-of-gravity determination performed by representing each output membership function by a discrete value whose magnitude is adjusted to reflect the non-linear relationship between a rule's strength and its influence on the command output value. Using the discrete values weighted in accordance with their pre-calculated area centers, with an adjustment for overlap between adjacent output functions, the center-of-gravity is accurately approximated without requiring piece-wise integration of the output centroid.

3 Claims, 9 Drawing Sheets

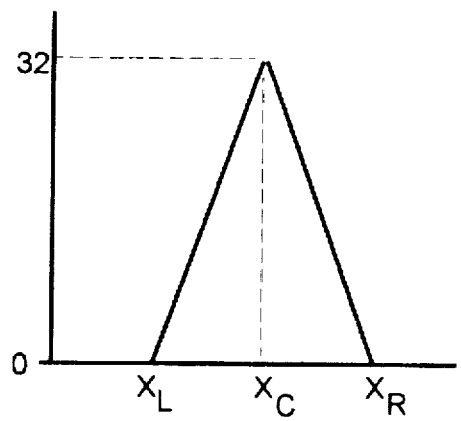
Fig. 2
| Left | Cntr | Right | Membership |
|---|---|---|---|
|  |  |  | Positive Large |
|  |  |  | Positive Medium |
|  |  |  | Positive Small |
|  |  |  | Zero |
|  |  |  | Negative Small |
|  |  |  | Negative Medium |
|  |  |  | Negative Large |
Fig. 3
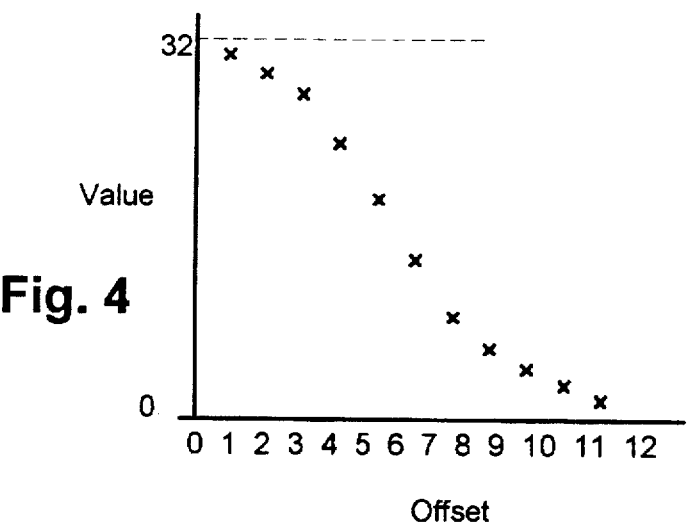
Fig. 4
Fig.5
| x1 | x2 | m1 | m2 | m3 | m4 | ... | mN | Membership |
|---|---|---|---|---|---|---|---|---|
|  |  |  |  |  |  |  |  | Positive Large |
|  |  |  |  |  |  |  |  | Positive Medium |
|  |  |  |  |  |  |  |  | Positive Small |
|  |  |  |  |  |  |  |  | Zero |
|  |  |  |  |  |  |  |  | Negative Small |
|  |  |  |  |  |  |  |  | Negative Medium |
|  |  |  |  |  |  |  |  | Negative Large |

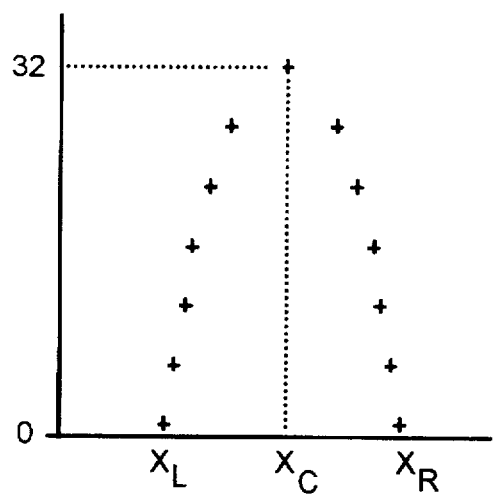
Fig. 6
Fig. 7 (a)
| x1 | x2 | m1 | m2 | m3 | m4 | ... | mN |
|----|----|----|----|----|----|-----|----|
|    |    |    |    |    |    |     |    |
| x1 | x2 | Membership |
|----|----|------------|
|    |    | Positive Large |
|    |    | Positive Medium |
|    |    | Positive Small |
|    |    | Zero |
|    |    | Negative Small |
|    |    | Negative Medium |
|    |    | Negative Large |
Fig. 7 (b)
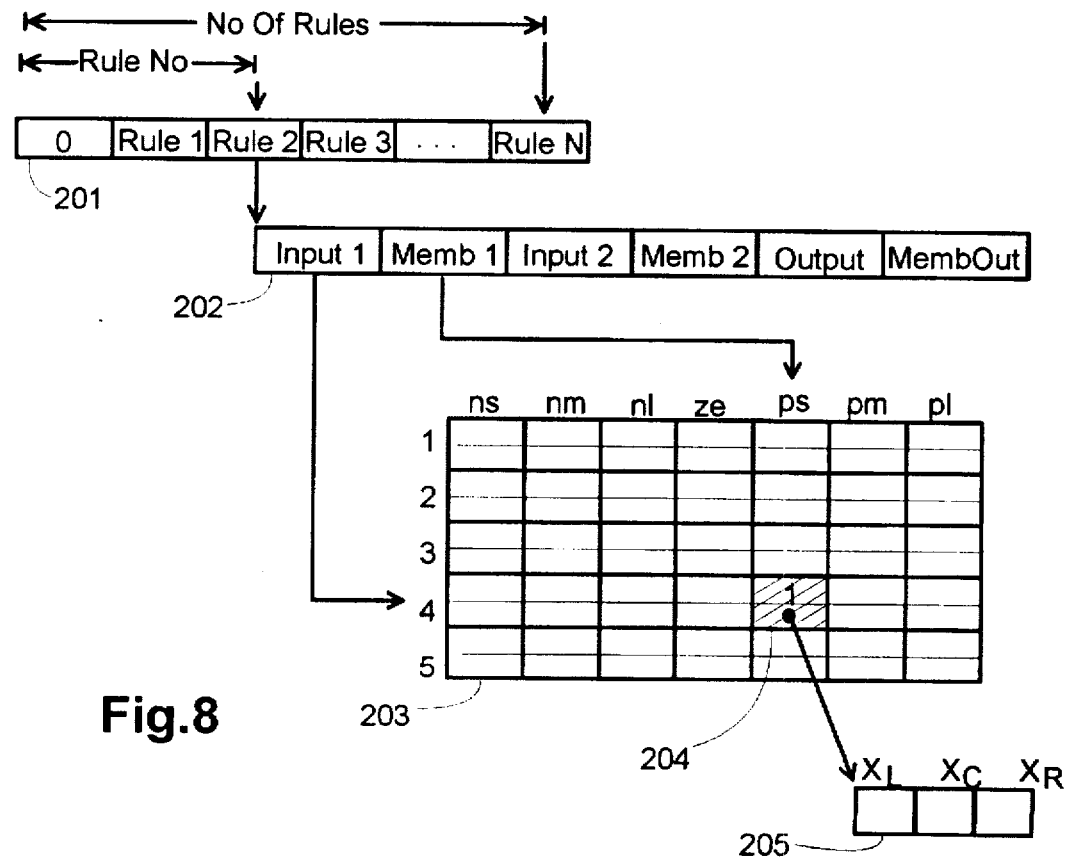
Fig. 8

FUZZY LOGIC OUTPUT DEFUZZIFICATION

This application is a continuation of application Ser. No. 08/172,991 filed Dec. 27, 1993, now abandoned.

FIELD OF THE INVENTION

This invention relates generally to electronic control systems and, more particularly, to a method for "defuzzifying" a plurality of satisfied fuzzy logic rules in a fuzzy logic controller to yield a single output command value.

BACKGROUND OF THE INVENTION

Control systems typically use feedback mechanisms to vary the value of one or more output command signals in response to variations in sensed system conditions. By manipulating signals which are directly proportional to sensed system conditions, as well as signals related to integrals or derivatives of sensed signals, accurate control of many dynamic systems may be successfully achieved. Such feedback control systems work well because they are able to model desired system performance, sense the state of the physical system and compare it with the desired model, and generate error-correcting feedback signals so that the physical system behaves in accordance with the desired model.

Frequently, however, even an elaborate proportional-integral-differential (PID) controller cannot accurately model more complex physical systems. Many control functions which humans easily perform cannot be automated by conventional feedback controllers. For example, the functions which an experienced automobile driver performs (turning the steering wheel, pressing the brake and accelerator pedal, and shifting gears) can't be handled by conventional controllers, because the driver's movements are based on a complex inputs which the driver processes based on past experience.

A technique called "fuzzy logic," developed by Dr. Lotfi Zadeh and described in "Fuzzy Sets," *Information and Control*, Vol. 8. No. 3, June 1965, pp. 338–53, has proven highly effective in controlling complex systems. Using fuzzy logic, input variables are processed against a collection of rules, each of which expresses a system objective in propositional form; for example: "if velocity is low and rpm is low then shift to 1st-gear." Unlike conventional logic, in which conditions are either satisfied or not satisfied, the conditions "velocity is low" and "rpm is low" may be only partially satisfied so that the rule is only partially satisfied. As a consequence, when the input conditions are only partially satisfied, the rule and its output directive to "shift to low gear" is assigned less "rule strength." In the fuzzy logic based controller, many such rules are evaluated concurrently. The actual gear selection is performed by combining all directives from all of the satisfied rules in accordance with the degree to which each rule was satisfied, thereby arriving at a consensus directive.

Fuzzy logic control systems allow the possible state or signal values assumable by the system to be classified into "fuzzy sets," each defined by a membership function. A membership function associated with a given signal thus provides an indication of the degree-of-membership the current value of that signal has with respect to the fuzzy set. Rules express both their conditions and their directives in terms of fuzzy sets. For example, a condition that "velocity is low" might be represented by a triangular membership function which yields a maximum degree-of-membership value at 4 mph, and which goes to zero at −3 mph and +11 mph. Given a current speed value, the membership function specified in the first rule condition yields a degree-of-membership value which is then combined with the degree-of-membership value from the second condition, "rpm is low," to determine the current rule strength. The rule's directive, "shift to low gear," is also expressed as a fuzzy set, with "low gear" being represented by a membership function which yields a degree-of-membership value for each possible gear ratio.

The determination of the "consensus" among all of the applicable rules is typically accomplished by a process called "defuzzification" in which the "center of gravity" of all of the satisfied rules is determined, taking into account both their rule strength, as determined by the degree to which each rule's condition(s) were satisfied, and the shape of the membership function for the rule's output directive. In complex fuzzy logic systems employing a large number of rules, the calculations required to reach the desired consensus output value are extensive. When control systems must operate in real-time, the speed at which the desired output control values must be calculated to keep pace with rapidly changing input signals can place a substantial burden on the system's computational resources.

Typical defuzzification methods place a substantial burden on the control processor, requiring multiple iterations of nested loops. The most common approach determines the center of area for the output centroid using piece-wise integration, performing a multiplication of each incremental area times its moment arm, to ultimately yield a center-of-gravity value. If the domain of the output command signal is divided into $\eta$ values, then $\eta$ incremental areas are determined in the integration process, and $\eta$ multiplies are required to calculate the moment arms. Due to this extensive requirement for multiplication, fuzzy logic controllers often must be implemented with expensive microcontrollers with hardware multipliers, or custom integrated circuits.

SUMMARY OF THE INVENTION

It is an object of the present invention to simplify and consequently improve the speed at which defuzzification can be accomplished by a fuzzy logic controller.

It is a related object of the invention to perform defuzzification with less expensive processing devices.

The present invention takes the form of a method and/or mechanism for converting a plurality of input signals from different sources into an output command signal value. A plurality of rules which define the objectives of the control mechanism are stored for reference, each rule comprising data consisting of one or more input membership functions and an output membership function.

In accordance with the invention, before input signal processing begins, each rule's output membership function is represented by a discrete, precalculated area-center value which specifies an output command signal value at the area center of the output membership function. In addition, an influence transfer function (ITF) is provided for translating a output rule strength for a given membership function type into an influence value which is indicative of the extent to which that rule strength value should influence the value of the output command signal.

During signal processing, the current values of the input signals are evaluated by the input membership functions of each rule to produce an output rule strength value. The rule strength value for each rule indicates the extent to which that rule's input membership functions are satisfied by the current input signal values. In accordance with the invention, the influence transfer function associated with each rule is then used to convert each such rule strength value into a current influence value used in later processing.

The influence transfer function (ITF) used for each membership area shape transforms a rule strength value into an influence value which reflects both the relative area of the shape and the non-linear relationship between rule strength magnitudes and the influence those magnitudes have on the desired output signal. The ITF conversion can be performed by an algorithmic process, but is preferably performed as a single-step table lookup operation which, in the case of output membership functions, is performed using a two-dimensional table indexed by a rule number (to identify a selected membership function size and shape.

In accordance with a further feature of the invention, negative influence values are also produced which represent the overlap between adjacent output membership functions. An intersection influence value is formed using the smaller rule strength value of the two rules having the adjacent output membership functions. This smaller rule strength is transformed by an ITF for the overlap area and the resulting negative influence value is then used in subsequent processing.

In accordance with still another feature of the invention, a total area value is formed by accumulating individual influence values, with the total area value being reduced by adding the negative influence values indicative of the relative areas of the overlapping intersections between the adjacent output functions.

In accordance with the invention, a total moment arm value is formed by accumulating the moment arm values for each of the rules, reduced by the moment arm values of each area of intersection. A rule's moment arm value is formed by the product of its influence value and its pre-calculated area-center value. An intersection area's center is obtained by determining the halfway point between the midpoint of the intersection area's baseline and the point of intersection of the two adjacent membership functions.

The final output command signal value for the current set of input signals is then obtained by dividing the total moment arm value by the total area value.

The defuzzification method contemplated by the invention produces output command values which closely approximate those produced by the more burdensome piece-wise integration scheme used in prior fuzzy logic controllers, but requires significantly less processing.

These and other objects, features and advantages of the present invention may be better understood by considering the following detailed description.

BRIEF DESCRIPTION OF THE DRAWINGS

In the course of the description of the preferred embodiment which follows, reference will frequently be made to the attached drawings, in which:

FIG. 2 is a graph of a triangular membership function used to convert signal values into degree-of-membership values for a fuzzy set;

FIG. 3 is a memory map of the values needed to specify the values needed to define seven triangular membership functions for a given signal;

FIG. 4 is a graph showing the relative locations of values stored in memory for a representative table lookup membership function;

FIG. 5 is a memory map of the values which define lookup membership functions for each of seven sets associated with a given signal;

FIG. 6 is a graph showing the locations of values stored in memory for a shape function;

FIGS. 7a and 7b are memory maps of the values needed to specify seven shape membership functions for a given signal;

FIG. 8 is a memory map illustrating the addressing mechanism used to specify the set of membership functions during the processing of a collection of rules to determine a defuzzified output value from a designated group of input values;

DESCRIPTION OF THE PREFERRED EMBODIMENT

Overview

Figure 1:
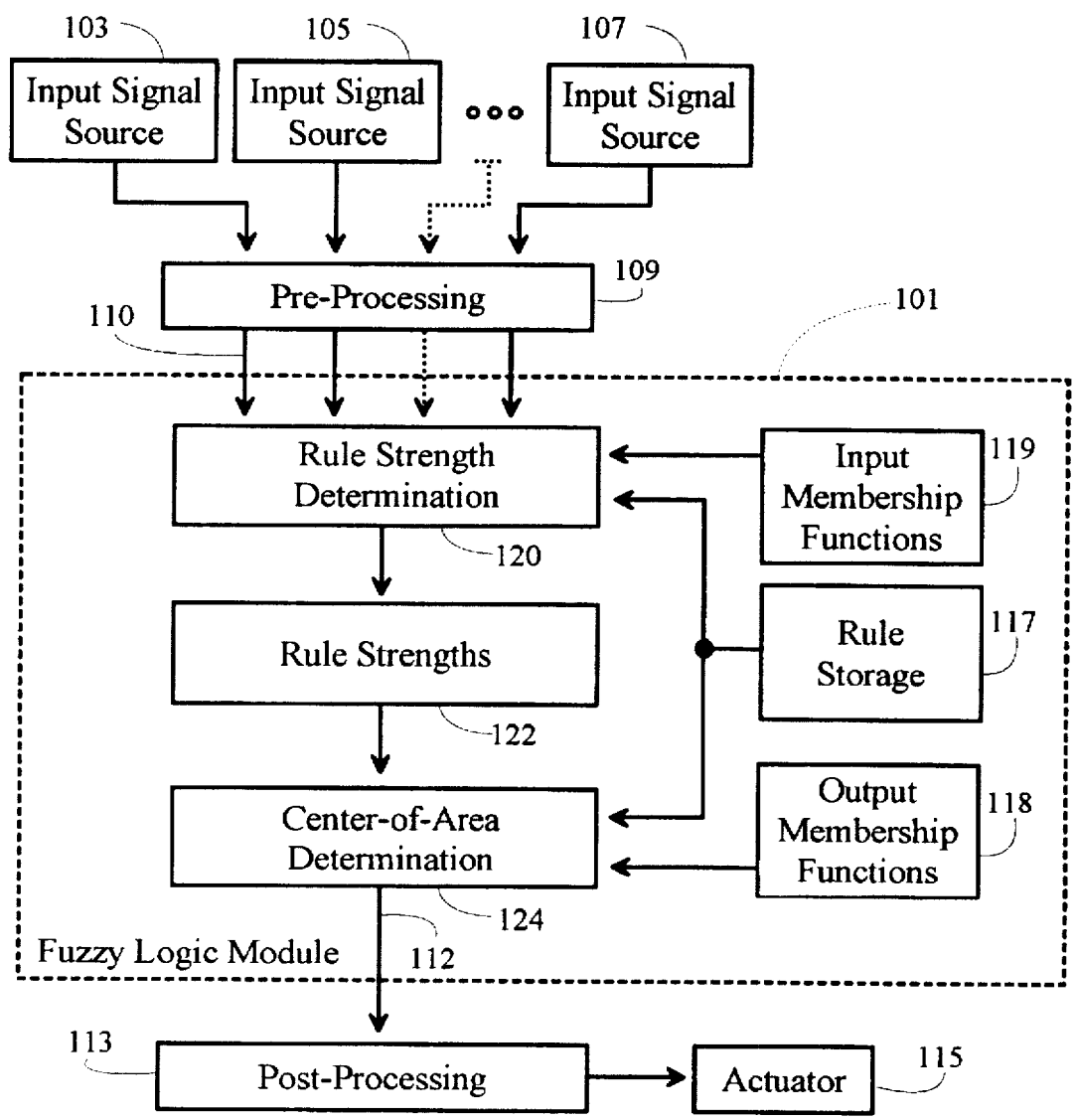
FIG. 1 is a block diagram illustrating the functional organization of a fuzzy logic controller adapted to employ the invention.

The embodiment of the invention to be described utilizes a programmed microcontroller to perform general-purpose fuzzy logic control functions as generally shown in FIG. 1 of the drawings. The fuzzy logic module 101 accepts input signals from several sources 103, 105 and 107, each signal being pre-processed at 109 to form normalized digital signals which take the form of integer values supplied to the module 101 by the fuzzy logic inputs 110. The module 101 repeatedly processes the current value of the digital input signals 110 to produce a sequence of digital integer output values at 112. This sequence of output values is then translated by suitable post-processing at 113 into a control signal for driving a utilization device, such as the actuator 115 seen in FIG. 1.

The logic module 101 creates the integer output signal values at 112 by comparing the input signals at 110 with conditions defined in a group of rules stored in memory at 117. The conditions expressed in the rules identify input membership functions which are stored at 119. The identified input membership functions from 119 are then used at 120 to determine a "rule strength" value for each rule indicating the extent to which the rule's input conditions are satisfied by one or more of the input signal value(s) at 110. The resulting rule strength values are stored temporarily at 122.

Using these stored rule strength values and the output membership functions stored at 118, the module then determines a "center-of-gravity" value at 124, yielding the output integer value at 112.

In prior arrangements, such as the general-purpose fuzzy logic controller described in U.S. patent application Ser. No. 08/085799 filed on Jul. 6, 1993, the center-of-gravity determination is performed in part by integrating degree-of-membership values produced by the output membership functions stored at 128 over the range of possible output integer values, with each degree-of-membership value being limited by the rule strength values stored at 122. The results from the integration are then processed to form a center-of-gravity value delivered as the "de-fuzzified" output integer value at 112. This prior piece-wise integration method for producing a center-of-gravity value will be discussed in more detail below in connection with FIG. 11 of the drawings.

In accordance with the present invention, the center-of-gravity determination indicated at 124 in FIG. 1 is accomplished by an improved mechanism which significantly reduces the computational burden placed on the fuzzy logic microcontroller, and permits lower-capacity microprocessors to achieve equivalent results. As described in more detail below in connection with FIG. 13-17 of the drawings, the improved defuzzification mechanism uses precalculated center-of-area values to represent the output membership functions seen at 118 in FIG. 1, processes the rule strengths 122 by means of influence transfer functions, which may take the form of one or more look-up tables in the microcontroller's read-only memory (ROM), and determines the desired output command values without the necessity of performing a piece-wise integration over the entire output signal domain.

This output integer 112 produced by the defuzzification process represents the consensus of all of the rules whose conditions are satisfied, to varying degrees, by the input signal values at 110, and may be converted by post-processing at 113 into a signal magnitude appropriate for controlling a utilization device, such as the actuator 115 shown in FIG. 1.

Standard Membership Functions

The principles of the invention may be advantageously used to reduce the cost of conventional micro-processor based fuzzy logic systems, such as the general purpose fuzzy logic module shown in FIG. 1. The fuzzy logic module employs "fuzzy sets" defined by membership functions having predetermined formats which are stored in memory and which characterize the values assumable by both the input signals and the desired output signal. To permit the use of standard processing methods, each input signal is preprocessed at 109, before being supplied to the fuzzy logic module so that a normalized signal level is supplied at 110 in the form of a digital integer having a predetermined range of possible values, e.g., 0 to 40.

In addition, a predetermined number of fuzzy sets is used to characterize the possible values assumable by each input signal level. In the preferred embodiment, each signal value is a member of one or more of seven sets which may be indicated by the semantic designations "negative large," "negative medium," "negative small," "zero," "positive small," "positive medium," and "positive large." Signal values which are outside a given set are assigned a zero degree-of-membership value, whereas each possible signal value within a given set is associated with a degree-of-membership value expressed as an integer having a predetermined range. In the preferred embodiment described here, the maximum degree-of-membership in a set is represented by the integer 32. Membership functions are stored in memory to translate each integer signal value into a degree-of-membership value for any designated fuzzy set associated with that signal.

Triangular Membership Functions

In order to efficiently store the potentially large number of data points necessary to define the membership functions needed for several input signals, the preferred embodiment stores each input membership function by defining the three corner points of a triangle. Triangular membership functions are bounded at the right and left by designated signal values representing the outer limits of signal values which are within the fuzzy set being defined. The third designated signal value indicates the signal value at which the maximum degree of set membership occurs. A representative standard triangular membership function defined by the three integer values $X_L$, $X_C$ and $X_R$ is shown in FIG. 2 of the drawings. FIG. 3 is a chart showing the array of stored integers which define the seven triangular fuzzy sets which are preferably used to evaluate each input signal.

Degree-of-membership values for triangular fuzzy set membership function are determined by locating the intersection of the vertical line, representing a signal value, with the triangle. The processing routine first determines whether the given input value lies within the boundaries of the triangle. If the input is outside the triangle, then the output degree-of-membership value is known to be zero since the input does not belong to that set. Once the input is determined to intersect the triangle, the routine determines if the input is to the right or left of the maximum or "center" value, $X_C$. The routine then determines the Y (degree-of-membership) co-ordinate at the intersection point given the X co-ordinate by using the slope-line equations:

For inputs right of center (that is, inputs greater than $X_C$):

$$\text{Degree of Membership} = [(X_R - \text{Input}) * 32 / (X_R - X_C)]$$

For inputs left of center (that is, inputs less than $X_C$):

$$\text{Degree of Membership} = [(\text{Input} - X_L) * 32 / (X_C - X_L)].$$

The scaling factor 32 is chosen to give rule strengths of appropriate resolution within the dynamic range. The maximum degree-of-membership at the "center" value $X_C$ a triangular membership function need not be midway between the two outer limits $X_R$ and $X_L$. For example, the fuzzy set "negative large" might be represented by a right triangle where both $X_C$ and $X_L$ are equal to 0, the lowest value assumable by an integer variable.

The corner-point designations for a group of seven triangular membership functions are preferably associated with each input function. The array of integers defining the seven triangular sets is illustrated in FIG. 3 of the drawings.

Each membership function is further identified in memory with a type indicator. For example, the value 1 indicates a triangular membership function, while 2 indicates a table lookup membership function, and 3 a bell-shaped function.

Table Lookup Membership Functions

The frequently accessed output membership functions stored at 118 are preferably represented in memory by table lookup values in order to speed computation. Each table lookup membership function is stored in memory as a sequence of numbers, beginning with the left and right outer range limits of the set $X_R$ and $X_L$, both of which yield zero degree-of-membership values, followed by $N=(X_R-X_L-1)$, degree-of-membership values respectively associated with the output signal values $(X_L+1)$ through $(X_R-1)$.

The shape of a typical lookup function (which may take any suitable form) is shown in FIG. 4. The data values for the lookup function are stored in memory as shown in the memory map of FIG. 5. The first two numbers, $X_R$ and $X_L$, of each function specify the outer limits of the fuzzy set, and the remaining values M1 through MN of each set represent the degree-of-membership values for the intermediate points. The lookup values graphically depicted in FIG. 4 might be appropriate for a "negative large" membership function defined by the stored data points: 0,12; 29, 27, 25, 21, 19, 16, 13, 11, 8, 5, and 3. With table lookup storage, the shape of the membership function is unlimited. It is, however, normally desirable to have a membership function that is continuous so that changes in the inputs don't cause abrupt changes in the output.

Bell-Shaped Membership Functions

Membership functions having predefined shapes may also be dynamically constructed at run time from stored template information. For example, a standard bell-shaped membership function having a shape depicted in FIG. 6 may be stored in a standard "high resolution" lookup table structure as seen in FIG. 7(a). As seen in FIG. 7(b), the upper and lower limits $X_L$ and $X_R$ only are stored for each of the seven fuzzy sets associated with the semantic designation of the output memberships. The actual lookup function is then derived by interpolation from the high-resolution function, scaling that function to the proper limits for each of the seven sets. If high speed processing is not required, this interpolation may be accomplished as part of the processing of each input signal value. Alternatively, the interpolation may be performed during process initialization to create a complete lookup data point array, organized as shown in FIG. 5 of the drawings, for each of the seven fuzzy sets associated with a given signal variable.

Rule Storage

The behavior of the fuzzy logic module is determined by a set of rules stored in memory, as seen at 117 in FIG. 1. The data structure used to define the rules consists of the following predetermined memory locations:

1. a memory location containing the value NoOfRules, the number of rules used to generate a given defuzzified output signal;
2. an array of rule addresses indexed by rule number; and
3. a variable length record structure for each rule defining one or more input signal conditions and an output directive.

Each input signal condition defined by a rule consists of a input identifier, which designates a particular input signal by number, and an input membership function identifier (e.g., nl, nm, ns, ze, ps, pm or pl) which specifies the particular fuzzy set to which the current value of the identified input signal must belong in order to satisfy the condition. Thus, an input condition might be expressed in a rule as "3,ps", a condition which would be satisfied whenever the current value of input3 is a member of the set ps (positive small).

Similarly, the output directive consists of the combination of an output identifier value and a membership function. For example, the output directive "output,pm" indicates that the output signal should be a member of the set pm (positive medium) when the rule's input conditions are satisfied.

A rule may contain more than one input condition. Thus, the rule "1,nl,2,ze,output,ns" can be stated as the linguistic proposition "if input1 is negative large and input2 is zero then the output should be negative small."

Rule Processing

FIG. 8 of the drawings illustrates the manner in which, given a stored collection of rules, the fuzzy logic module locates the information structures required to calculate "rule strength" values.

The rules themselves are stored in memory at addresses which are stored at 201 in an array of rule addresses. The rules may accordingly be accessed, by the rule number, from 1 up to and including the value NoOfRules, which is stored in memory to specify the last rule stored. In the example shown in FIG. 8, the array 201 is indexed by rule number 2 to yield the address of the second rule 202. The second rule at 202 contains a pair of input conditions and an output directive. The first condition identifies the particular input signal to be tested. Input1=4, to specify row 4 in an array 203 which contains membership function identification information for signal number 4 as defined in 110. The column of array 203 is specified by the first membership function identifier Memb1 in the rule 202. In FIG. 8, the value of Memb1 is "ps" (positive small), thus specifying the cell 204. The cell 204 contains two values: the first value "1" specifies the type of membership function (triangular) which has been selected to define the "ps" (positive small) set for the fourth input signal. The second portion of cell 204 contains the address of the data defining the triangular function which, in this case, is a triangular function defined by the three corner values $X_L$, $X_C$ and $X_R$ stored at 205. In the same way, the fuzzy logic module is able to identify the type and location of every membership function and its associated input signal in order to evaluate all of the rules governing the fuzzy logic translation of the sensed input signals into a desired output signal.

Rule Strength Determination

As indicated in the block diagram of FIG. 1, the fuzzy logic module processes the input signals at 110 by first determining the strengths of the rules, given the current input values, and stores the rule strengths at 122. After the rule strengths have been determined, the process then determines a center-of-gravity value at 124. This processing is shown in more detail in the flowchart, FIG. 9.

Figure 9:
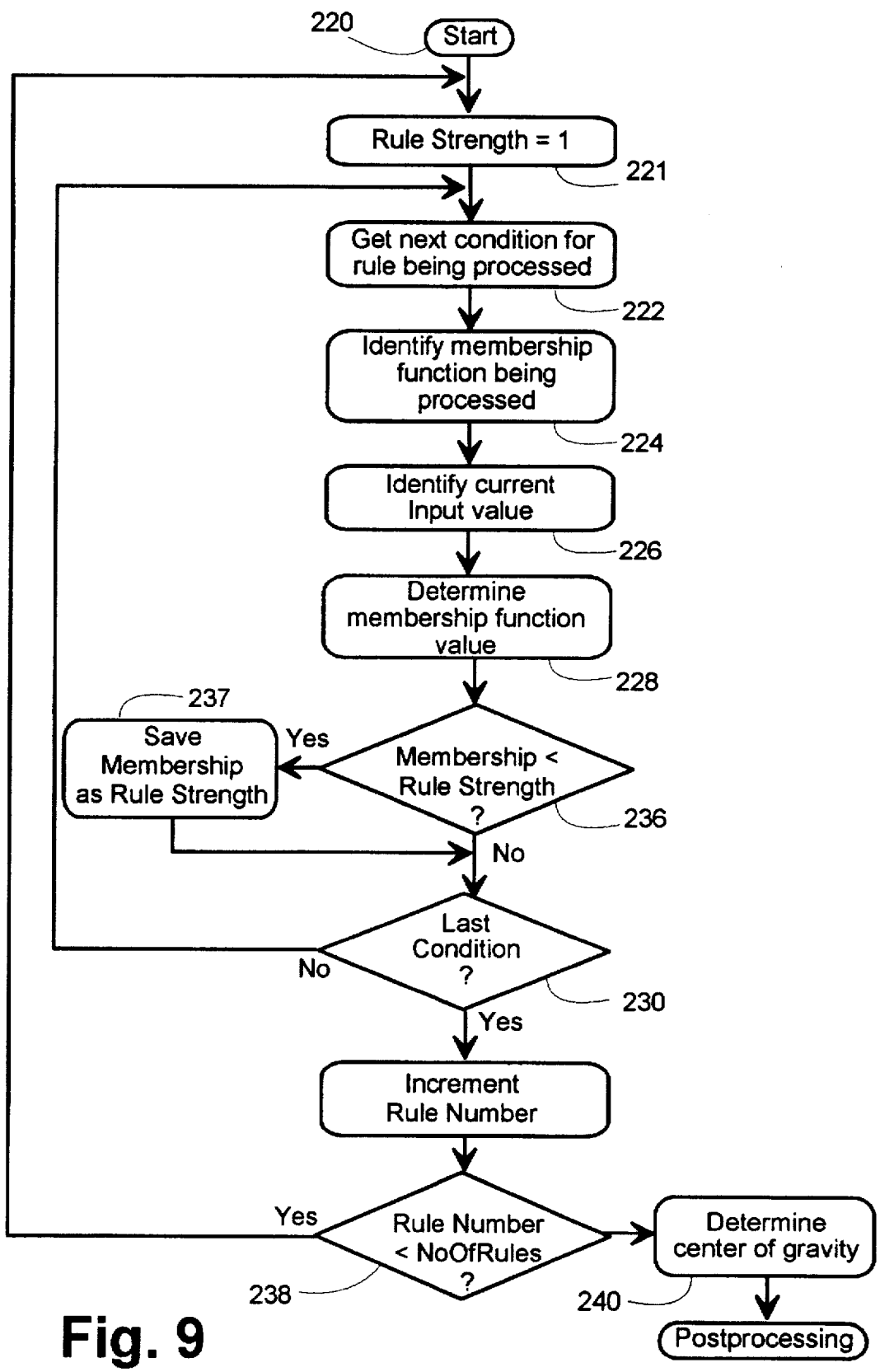
FIG. 9 is a flow chart illustrating the processing steps used to evaluate the applicability of a collection of fuzzy logic rules to develop an output control signal magnitude.

Rule processing begins at 220 as seen in FIG. 9. Before each rule is evaluated, its rule strength variable is initialized to 1 at 221. Each rule condition is then identified at 222, its membership function is located at 224, and the current value of the input signal associated with that condition is obtained at 226. The membership value specified by the located membership function given the associated input signal value is then determined at 228.

As shown in FIG. 9, those rules which contain more than one condition combine those conditions using a logical AND operator. Rules which combine conditions using the logical OR operator are not used; instead, equivalent relationships are established using separate rules to express the separate conditions. By limiting the relationship between conditions within a rule in this fashion, processing is simplified and less storage space is consumed by the rules, which need not include fields indicating the logical relationship between conditions.

The fuzzy logic equivalent of the AND operation is performed by selecting the minimum (MIN) condition membership value among the conditions within a rule. Thus, if any condition is totally unsatisfied (that is, evaluates to a zero value), the result is zero. For single condition rules, the "rule strength" of each rule is simply the output of the single identified membership function given the current input value. If the rule has more than one condition, the rule strength to be saved for later processing is the minimum membership value, located by the test at 236 and saved at 237. If the conditions within a given rule were joined by a logical OR operator, then the appropriate result of the logical combination would be formed by the maximum (MAX) of the condition membership values.

After each rule strength is stored, the current rule number is compared with NoOfRules at 238 to determine if more rules are to be processed. If not, the process continues with the next step, the determination of the center-of-gravity at 240.

Figure 10:
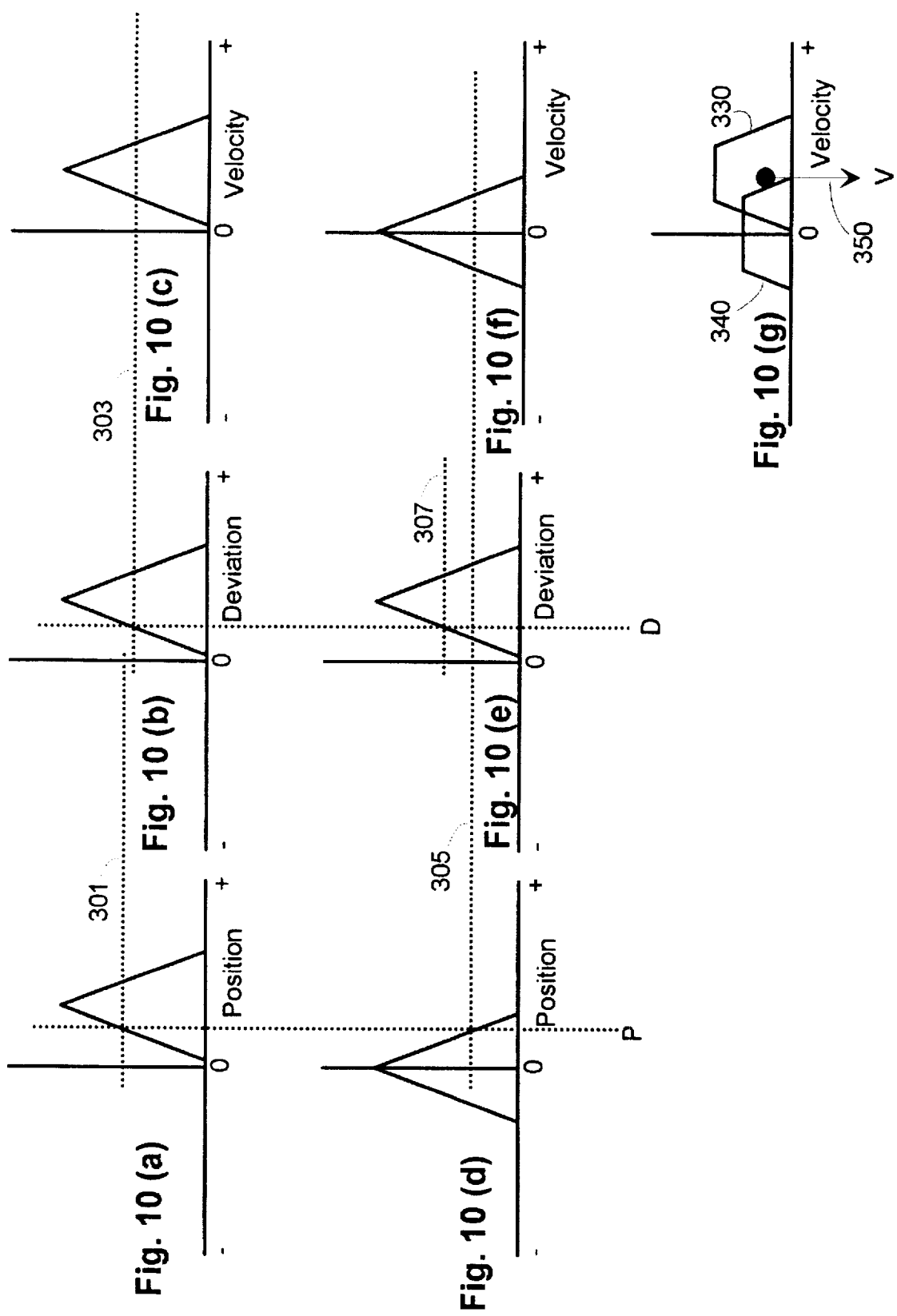
FIGS. 10(a), 10(b), 10(c), 10(d), 10(e), 10(f) and 10(g) are illustrative graphs showing the triangular input and output membership functions defined by two rules and the manner in which those rules are processed with respect to two input signals to yield an output control value.

The processing steps described above are illustrated graphically in FIG. 10, parts (a) through (f), which depicts a control system for generating an output signal indicating a desired velocity V from two input signals, a position signal P and a deviation signal D, based on two rules. FIG. 10(a)–(c) illustrates the first rule which might be written "P,ps,D,ps,output,ps"; that is, if input position P is positive small, and the deviation D is positive small, then the velocity V should be positive small. FIG. 10(d)–(f) illustrates a second rule which could be written as "P,ze,D,ps,output,ze" or, "if P is zero, and D is positive small, then V is zero." Example input signal values P and D are shown by the dotted vertical lines P and D in FIG. 10.

The first condition seen in FIG. 10(a) is satisfied if the position signal P is positive small. P intersects the triangular membership function, yielding the degree-of-membership value indicated by the horizontal line 301. For the second condition of the first rule, the smaller amplitude input signal value D (deviation) also satisfies the triangular membership function seen in FIG. 10(b), yielding the degree-of-membership value 303. Since value 303 is smaller than the value 301, it becomes the stored "rule strength" value for the first rule.

P and D also satisfy both input conditions of the second rule, as illustrated at FIGS. 10(d) and 10(f). The smaller degree-of-membership value 305 from the first condition at FIG. 10(d) is smaller than the value 307 produced by the membership function at FIG. 10(e), so that the value indicated by 305 is stored as the rule strength for the second rule. These two stored rule strength values are then used to determine the center of gravity, as next discussed.

Center Of Gravity Determination Using Piece-Wise Integration

As indicated in FIG. 1 at 122 and 124, after the strength of each rule has been determined for the current input signal values, the module next determines a "center of gravity" value representing the "de-fuzzified" consensus of all of the rules which have been satisfied, as indicated by non-zero rule strength values.

Figure 12:
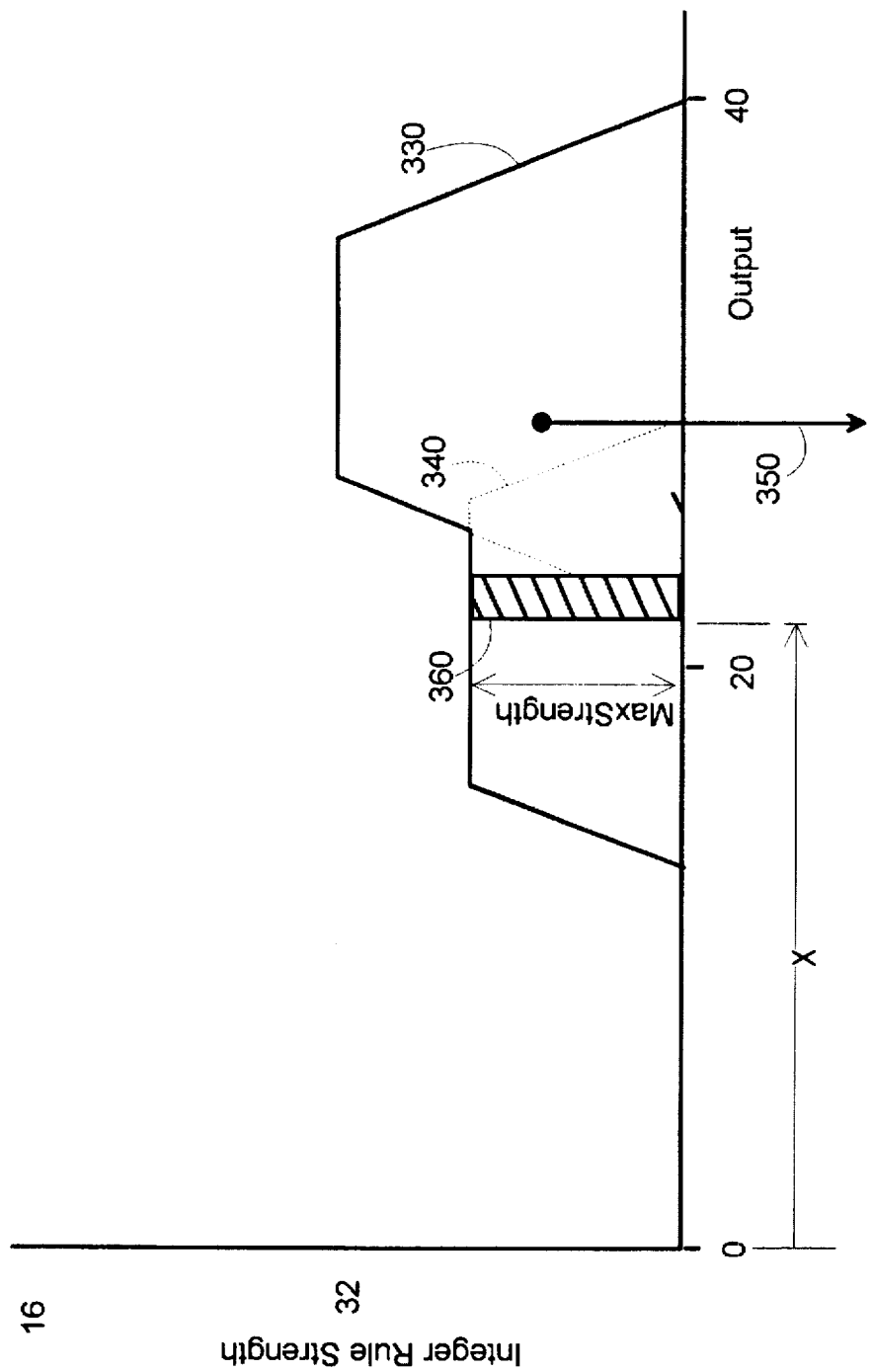
FIG. 12 is an enlargement of FIG. 9(g) which illustrates the piece-wise integration method for determining a center-of-gravity value.

The de-fuzzified output value may be determined by a numerical integration process which is illustrated by FIG. 10(g), which is enlarged in FIG. 12. The output value is determined by integrating the area under a curve formed by the point-to-point maximum output degree-of-membership value of each satisfied rule, as limited by that rule's strength. This curve is seen in FIGS. 10(g) and 12, and represents the maximum of two trapezoid shapes 330 and 340. Trapezoid 330 is the curve formed by the triangular output membership function of the first rule seen in FIG. 10(c), as limited by that rule's strength value 303. The smaller trapezoid 340 is formed by the triangular output membership function of the second rule seen in FIG. 10(f), as limited by the second rule's strength value 305. The first rule, which was more strongly satisfied than the second rule, indicated that the output value V should be within the set "positive small," while the second rule, which was less strongly satisfied, indicated that the output value V should be within the set "zero." The defuzzification process provides a defuzzified result signal which represents a consensus value, visually seen in FIGS. 10(g) and 12 as the center-of-gravity 350 of the area under the curve formed by the maximum of the two trapezoidal shapes 330 and 340.

Figure 11:
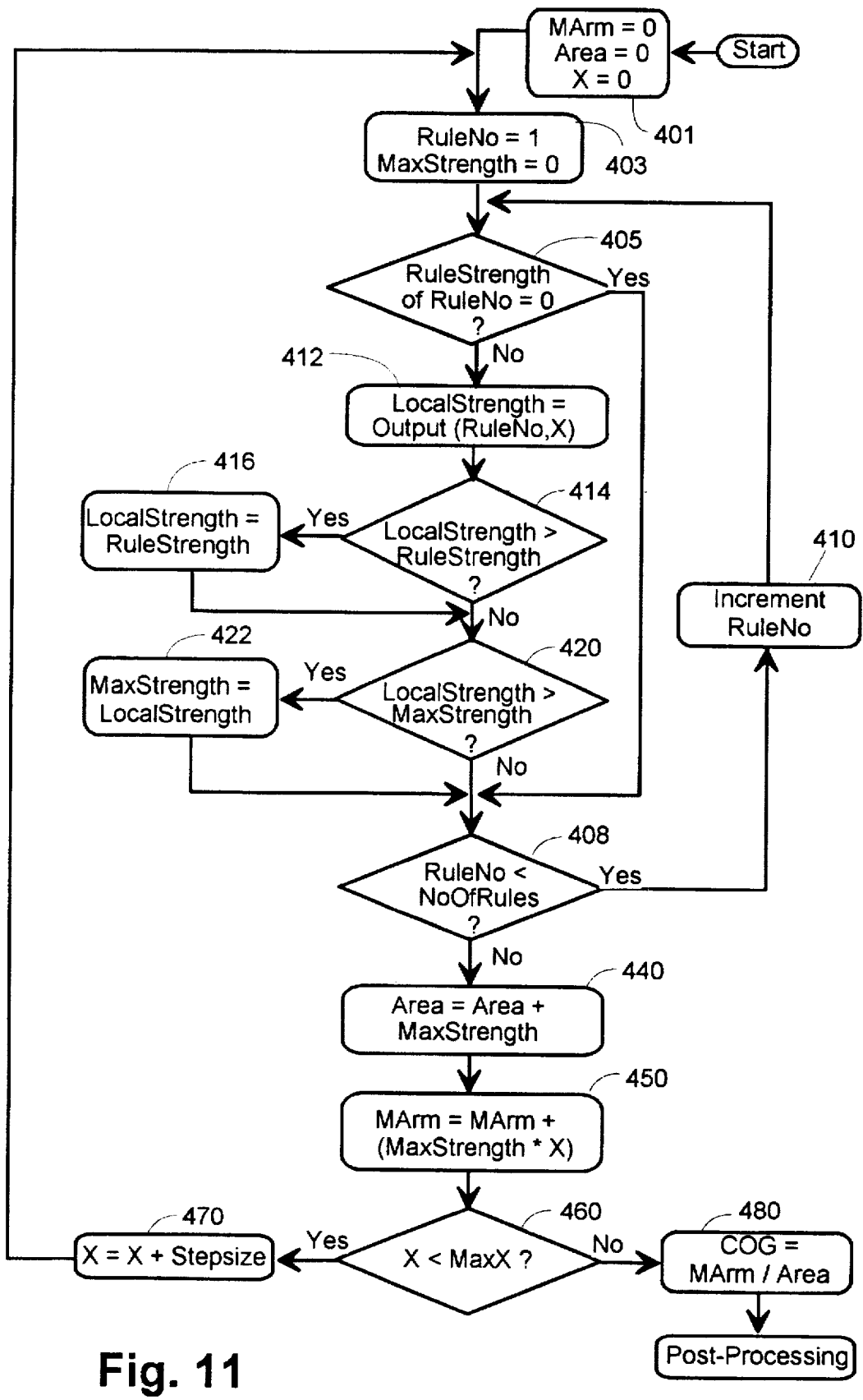
FIG. 11 is a flowchart illustrating the processing steps used in performing a center-of-gravity determination using piece-wise integration to form the desired output signal magnitude.

The previously employed, piece-wise integration method for determining the center-of-gravity value is illustrated in more detail by the flowchart seen in FIG. 11 of the drawings. The procedure produces, by numeric integration, two values: a total moment arm value MArm and a total area value Area, both of which are initialized to zero at 401 as soon as the routine starts at the entry point indicated at 400 in FIG. 11. The integration is repeated by varying the value of the output variable X from 0 through MaxX. The values for the variables RuleNo and MaxStrength are initialized to 1 and zero respectively at 403 (and are re-initialized to those values at 403 for each new value of X).

The rule strength previously determined (as discussed above in connection with FIG. 9) for the rule identified by RuleNo, is then checked at 405. If the rule strength is zero, that rule will not make a contribution to the output value and an immediate jump is accordingly made to 408, where current value of RuleNo is checked to determine if it is equal to RuleNo, and hence identifies the last rule to be processed. If RuleNo is less than NoOfRules, RuleNo is incremented to the next rule number at 410 and a return is made to 405 to continue the processing of that rule.

If RuleStrength is non-zero, control is passed to 412 where the output membership function for the rule specified by RuleNo is used to determine a degree-of-membership value LocalStrength, given the current value of X. LocalStrength is then compared at 414 to the RuleStrength value previously determined for the rule specified by RuleNo. If the rule's rule strength is less than LocalStrength, LocalStrength is replaced by that smaller value at 416. At this time, LocalStrength is an integer representative of the rule's directive value, taking into account the current input signal values, the degree to which those input signal values satisfy the rule's input conditions, and the value specified by the rule's output membership function for the current value of X.

If the resulting rule directive value LocalStrength after the test at 414 is greater than MaxStrength, it replaces the former value of MaxStrength at 422, so that MaxStrength holds the maximum directive value produced by one of the rules after all of the rules have been processed for a given value of X (as indicated when RuleNo is no longer less than NoOfRules when tested at 408).

Thus, as seen in the graph of FIG. 12, the routine described above determines the value MaxStrength for each value of X, and MaxStrength corresponds to the height of a subarea of integration indicated by the shaded rectangle 360 in FIG. 12. The total area under the curve defined by a succession of MaxStrength values as X changes is determined by accumulating the values of MaxStrength in the variable Area as indicated at 440 in FIG. 11. The value MArm is then incremented at 450 by the moment arm of the subarea, which is equal to the product (X*MaxStrength). The value of X is then tested at 460 to determine if the end of the integration interval MaxX has been reached. If not, X is incremented by the value Stepsize at 470, and control is returned to 403 to re-initialize RuleNo and MaxStrength for the next X value to be processed.

At the conclusion of the integration interval, the center-of-gravity value COA is determined by dividing MArm by Area at 480. The module then passes this value, which represents the desired defuzzified output signal, to an appropriate utilization routine for postprocessing at 490.

As next described, the defuzzification mechanism contemplated by the present invention represents a substantial improvement over the piece-wise integration mechanism depicted in FIG. 11. To better understand the principles upon which this improved scheme is based, attention should next be focused on the relationship between overlapping output membership functions and the manner in which such overlapping functions are represented in the improved scheme.

TRIANGULAR MEMBERSHIPS VS SINGLETONS

Most fuzzy logic systems, like the general purpose fuzzy logic system which has been described, use triangular and trapezoidal output membership functions to define the output centroid. The output memberships are overlaid to generate a centroid whose center of area is the output of the fuzzy logic block. The membership functions may be instead represented by "singletons" which define the output membership by a discrete output domain value and the rule strength for the membership. Since there is no need for determining areas or moment arms of areas, the use of singletons can significantly reduce the computational demands placed on the fuzzy logic processor. However, singletons alone provide only a poor approximation of the desired output quantities, making them inappropriate for most applications.

The inaccuracies stemming from the use of singletons flow from two major differences in the methods. First, triangular or other shaped memberships account for a weighted area of the domain, whereas singletons define a single discrete output in the domain. When combining the multiple triangular membership outputs to derive the fuzzy logic output, the overlapping area is not counted twice in the weighted output. As seen in the example of FIG. 12, the overlap between the membership shapes 330 and 340 is only counted once in computing the center of gravity value 350. Singletons, however, are accumulated by summing area-less output membership weights which do not take into account any overlap between adjacent membership functions.

The second difference results from the influence that the individual output membership has on the total output. For triangular/trapezoidal memberships, as the membership strength increases, the influence (or area) of the output does not increase linearly as it does for a singleton. The triangular membership's influence increases quickly for low membership rule strength and tapers off as the membership rule strength approaches one.

INFLUENCE VALUE METHOD

The improved method for determining the output center-of-area value as contemplated by the present invention takes into account the previously described characteristics of the triangular membership method while exploiting the simplicity of the singletons method. The method involves the determination of a center-of-area for the centroid by calculating a representative signed and scaled influence value (IV) for each output membership function and for each overlapping area between adjacent membership functions. The influence value method, by taking into account (1) the potential overlap between two satisfied output rules, (2) the non-linear relationship between a rule's strength and its relative area, and (3) possible variations in the rule's center-of-area as a function of rule strength, produces accurate results without need for piece-wise integration. Moreover, by implementing the influence value method with precalculated lookup tables, the need for multiplication during signal processing can be substantially reduced or eliminated, still further reducing the computational burden on the processor.

Figure 13:
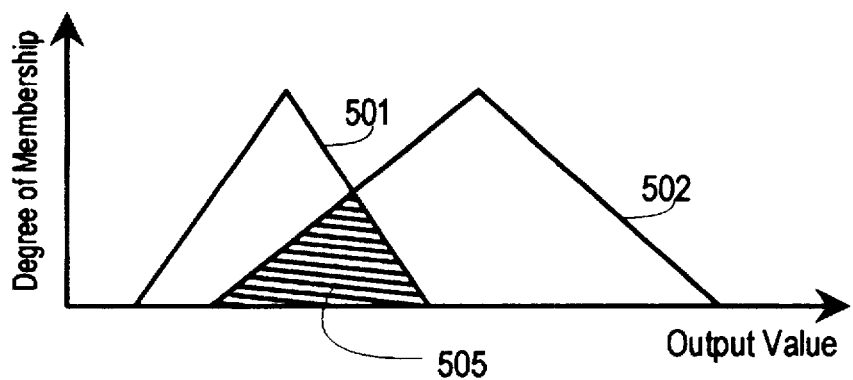
FIG. 13 is a graph of two adjacent and intersecting output membership functions.
Figure 14:
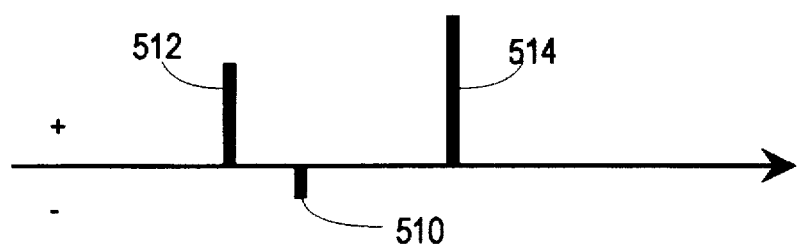
FIG. 14 is a graph showing three discrete Influence values which are used to represent the two membership functions and their intersection as seen in FIG. 13.

FIG. 13 of the drawings illustrates the effect of overlap areas between two intersection output functions. As seen in FIG. 13, when the two triangular output membership functions 501 and 502 overlap, the effective area of the output centroid may be determined by conventional piece-wise integration (as previously illustrated by FIG. 12) which does not count the area of intersection (seen at 505) twice. When the singleton method is used, the intersection area is effectively, and inappropriately, counted twice in determining the output command signal. In accordance with the present invention, as illustrated in FIG. 14 of the drawings, the intersection area is represented by a negative influence value 510 which represents the intersection area 505 seen in FIG. 13. The negative value 510 is positioned at the center-of-area of the overlap 505, between the positive influence values 512 and 514 which correspond to and represent the output membership function areas 501 and 502 respectively as seen in FIG. 13.

The output memberships are initially defined as shaped membership functions. For simplicity of discussion in the examples to follow, these initially defined membership functions will be assumed to have triangular shapes, although the principles of the invention are applicable to any predefined shape, including standard trapezoidal and bell-shaped membership functions. Once the membership shape is defined, the center-of-area of that shape may be determined. If the shape is symmetrical about its center-of-area, the COA value is independent of rule strength; otherwise, the determination of the COA value as a function of rule strength may be determined by algorithm, or as a part of a table-lookup operation based on the current rule strength value, as discussed below.

Figure 15:
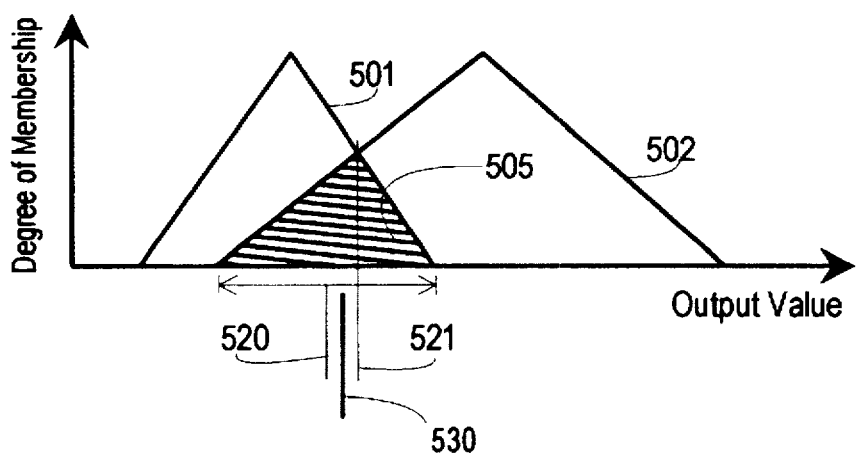
FIG. 15 is a graph showing the method of determining the center-of-area value for the intersection between adjacent membership functions.

FIG. 15 illustrates the manner in which the center-of-area (COA) location may be determined by algorithm for the overlapping portion of two intersecting triangular membership functions. The overlap COA which is determined is halfway between the mid-point 520 of the base line of the intersection triangle 375 and the value at 521, the point of intersection of the two membership functions 501 and 502. The resulting value 530 may thus be determined by the function IntCOA=(Midbase+Intpoint)/2, where IntCOA is the center-of-area 530 for the intersection area, Midbase is the midpoint 520 of the intersection triangle, and Intpoint is the output domain value 521 at the intersection of the two membership functions. This method of determining the overlap center-of-area value assumes that the intersecting output membership functions are triangular, and that the center-of-area is independent of rule strength. In many cases, even when non-triangular functions are used, this approximation provides adequate accuracy when the relative area of the overlap is small in comparison to the relative areas of the output membership functions.

To compute the magnitude of the negative IV representing the intersection area, the rule strengths of the two overlapping membership functions are compared and the smaller is used to compute the IV using an ITF to transform that smaller rule strength into a negative influence value representing the area of overlap. This negative IV magnitude, and its position in the output signal domain, is used in the subsequent processing as discussed below to more rapidly generate the desired center-of-area (COA) for all of the satisfied output membership functions which is used as the final, defuzzified output command value.

Figure 16:
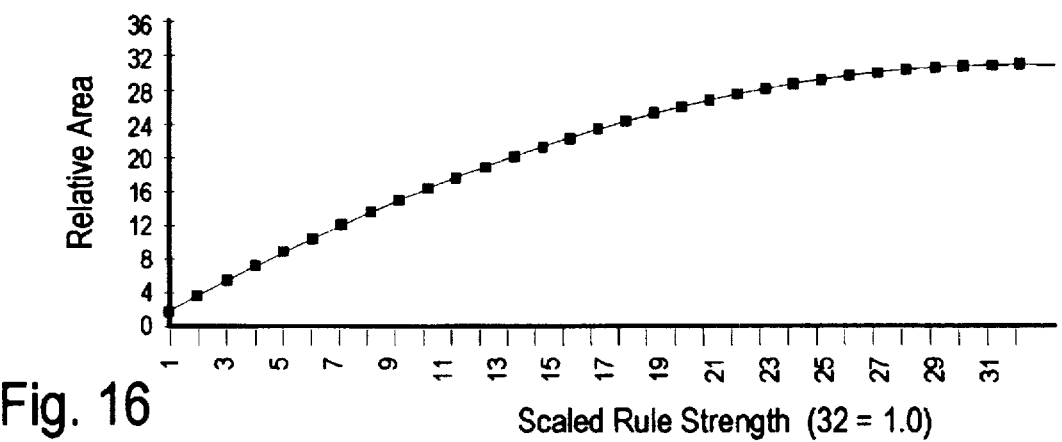
FIG. 16 is a graph of an influence transfer function of the type employed to translate rule strengths into Influence values.

As illustrated in FIG. 12, the rule strength value has the effect of truncating the output membership to an upper limiting value. Thus, a triangular output membership function is truncated to a trapezoidal shape. As a consequence, the relative area of the output membership function is a non-linear function of the current rule strength applicable to that function. To compensate for this non-linear relationship between the rule strength of a shaped membership and the influence that rule strength has on the final command value, it is preferable to further modify both the positive and negative IV magnitudes to account for this effect. FIG. 16 of the drawings illustrates the relationship between the scaled rule strength (represented as an integer from 1 to 32, used to digitally represent the rule strength domain 0 to 1.0) and the effective area of a truncated triangular membership function. As seen in FIG. 16, as the rule strength increases, the influence (area) of the output function increases quickly for low rule strengths, but the increase tapers off as the rule strength approaches is maximum. The use of singletons which have a magnitude directly proportional to rule strength accordingly yields errors which can be avoided by the use of an Influence Transfer Function (ITF).

The influence transfer function (ITF) may be advantageously implemented in whole or in part by means of look-up tables to produce, for each output membership function and for each overlap area, both an influence value indicating relative area and a moment-arm value indicating the product of the influence value times the associated center-of-area value.

If desired, the rule strength value may be used to index a lookup table which stores "influence strength values" which reflect the non-linear relationship between a rule's strength and its influence on the output command value. That rule strength may then be multiplied times a value determined by the shape and size of the area to obtain an signed influence value (IV) which may be added directly to a total-area value without requiring piece-wise integration. Alternatively, the IV values themselves may be stored in the lookup table, eliminating the need for the multiplication to obtain each relative area value as performed when using the conventional piece-wise integration method.

Similarly, the moment arm values may be produced directly by table lookup rather than by multiplying the IV (obtained as noted above) times the center-of-area value. By using a table which directly stores moment-arm values indexed by rule-strength values, a single table lookup provides accurate moment-arm values in a single operation, even when the center-of-area is also a function of rule strength.

As has been discussed, an Influence Transfer Function (ITF) is thus preferably defined for each unique membership function shape and size. The Influence Transfer Functions are then used to map each non-zero output rule strength into an area proportional and shape-transformed influence value (IV), and a moment-arm value. The rule's influence value determines the individual rule's influence on the output signal value. The needed transformations preferably are implemented using a separate lookup table which is precalculated and stored (e.g. in ROM) for each membership function size and shape. To the extent membership functions have like shapes and extents, those functions can share the same ITF table.

Figure 17:
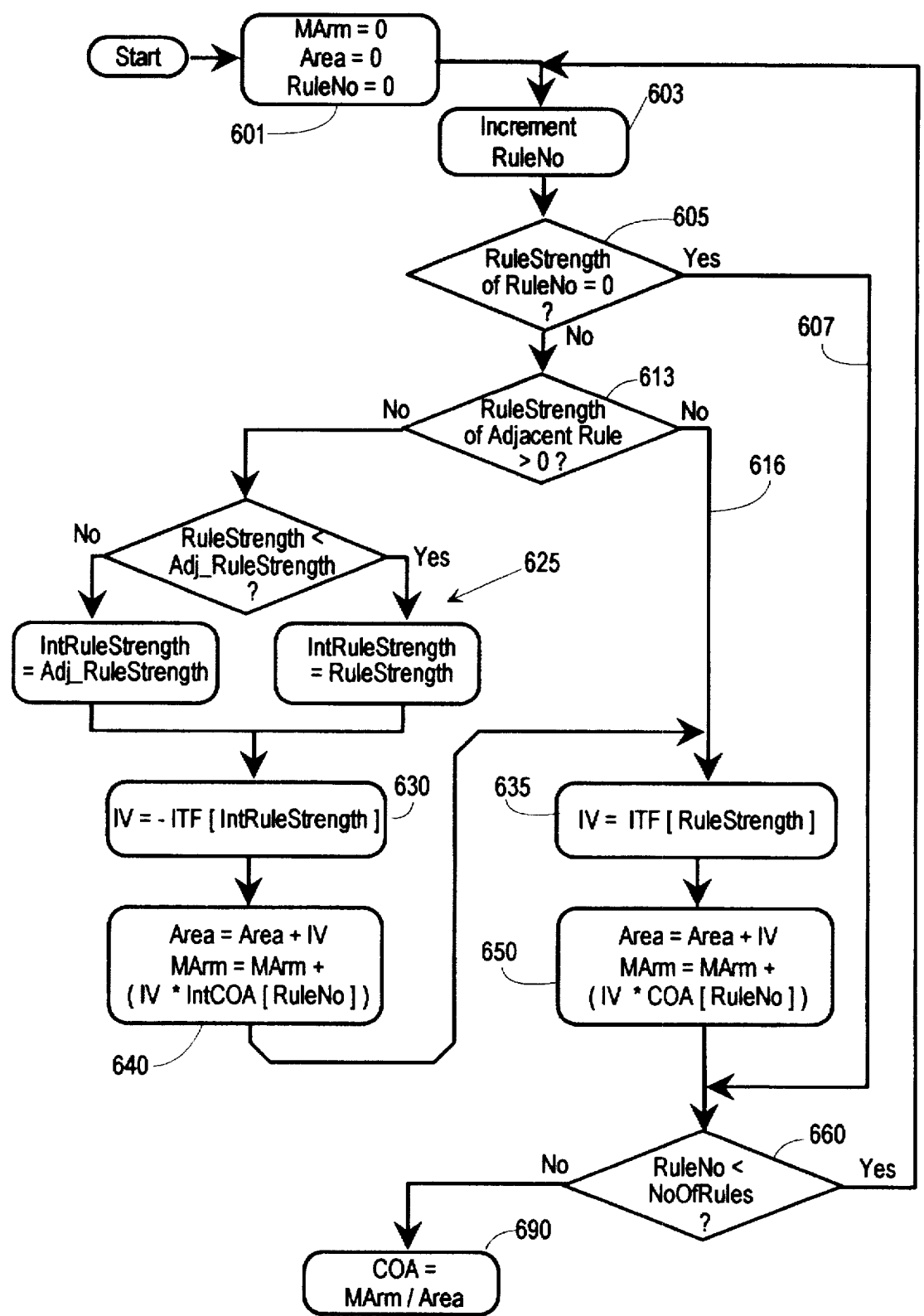
FIG. 17 is a flowchart illustrating the processing steps used in performing a center-of-gravity determination using the principles of the present invention.

The operation of the preferred defuzzification mechanism employing the invention is illustrated by the flowchart of FIG. 17. Briefly, the method depicted in the flowchart may be summarized as follows:

1. The output memberships are transformed into the scalar position values representing the center of area of each output membership function;

2. The data forming the ITF lookup tables (comprising η values representing a domain of η discrete possible rule strength values) is stored for reference to provide an Influence Transfer Function (ITF) for each different membership shape and size;

3. The output membership rule strengths, which may be calculated as described in connection with FIG. 9, are transformed into IV magnitudes using the resulting ITF transformation mechanisms. The magnitude of each rule strength is transformed by the ITF and to form the rule's influence value IV. The lesser of the two adjacent rule strengths is used as the rule strength for the intersection area. Just as the position COA for the positive IV's is the precalculated center-of-area of the membership function shape, the COA position value for the intersection membership may likewise be precalculated (e.g., for triangular overlap areas, the COA position may be closely approximated by the point half-way between the mid-point of the base of the overlap triangle and its apex, as depicted in FIG. 15). The IV value determination is preferably implemented by means of lookup tables which store IV values indexed by rule-strength values, with a separate table being used for each unique area size and shape.

5. A total area value is formed by summing the influence values (IV's) thus determined, and a total moment arm values is formed by summing incremental moment arm values, each of which may be formed by multiplying a rule's derived influence value times its COA position value, or by means of a direct table lookup using table(s) which directly store moment arm values indexed by rule-strength values. The negative IV's representing intersections are added to (and thus reduce) the total area value and the negative moment-arm values for the intersections are likewise added to (and thus reduce) the total moment arm value, thereby accounting for the overlap between adjacent output membership function shapes.

6. The final, defuzzified, center-of-area (COA) value is obtained by dividing the total moment arm value by the total area value.

The flowchart of FIG. 17 illustrates operation of the preferred defuzzification mechanism in more detail. The process begins at 601 by zeroing three process variables, MArm, Area, and RuleNo, integers which represent the total moment arm, total area and the current rule number. RuleNo identifies the rule currently being processed and assumes values ranging from its initialized value of one to the value of the last rule, NoOfRules (a constant). Thus, after the initial zero value of RuleNo is incremented to 1 at 603, processing begins with RuleNo=1.

The RuleStrength of the rule designated by RuleNo is tested at 605 to determine if it is zero. If RuleStrength=0, that rule will make no contribution to the output signal magnitude and further processing of that rule is bypassed as indicated at 607.

If the strength of the adjacent rule, Adj_RuleStrength, is zero, as indicated by the test at 613, processing of the overlap intersection area may be bypassed as indicated at 616. Preferably, the rules are arranged in order by the COA value of their output membership functions, so that the "adjacent rule" is identified by the quantity (RuleNo−1).

The lesser of RuleStrength and Adj_RuleStrength is selected at 625 as the value IntRuleStrength, the rule strength assigned to the intersection. This value is then transformed using a ITF at 630 to form an Influence value IV. As a reasonable approximation, a single ITF lookup table based on a triangular shape may be used to transform all of the overlap area shapes. For the positive membership functions, the ITF used is varied from rule to rule, based on the possibly changing shapes and relative magnitudes of the output membership functions. Thus, at 635, a two-dimensional ITF lookup table is employed so that the transformation output IV depends both on the value of RuleNo and RuleStrength.

As indicated at 640, the negative IV value for the overlap area is used to reduce the size of the total area variable Area, and is multiplied time the center-of-area value for the overlap area IntCOA to form a negative product value which is used to reduce the size of the total moment arm variable MArm. The center-of-area value IntCOA is precalculated and stored for each overlap area by means using the relationship described in connection with FIG. 13. Alternatively, the MArm value may be incremented by an intersection moment-arm value equivalent to (IV*IntCOA[RuleNo]) stored in a lookup table indexed by rule strength, in which case the value of IntCOA may be a variable function of rule strength to represent non-symmetric overlap areas.

After intersection processing is completed, the influence value IV for the output membership function for RuleNo is determined at 635, and the result is used at 650 to increment the total area value, Area. Also at 650, the IV value may be multiplied times a center-of-area value COA precalculated and stored for that RuleNo, and the resulting product, which represents the moment arm value for that rule, is then added to the total moment arm value MArm. Alternatively, the moment arm value for that rule may be determined directly by lookup table of moment arm values indexed by rule strength, which eliminates the need for a multiplication and which accommodates non-symmetric output membership functions.

If the rule which has been evaluated is not the last, as indicated by the test at 660, control is returned to 603 which increments RuleNo by one to evaluate the next rule. When all of the rules have been processed, as indicated when RuleNo is equal to NoOfRules, the final output center-of-gravity value COA is determined by dividing MArm by Area as indicated at 690.

The defuzzification method contemplated by the invention as illustrated in FIG. 17 can be rapidly performed by the microcontroller which implements the fuzzy logic control module seen, for example, in FIG. 1. In a system as illustrated in FIG. 17 having seven rules and seven output memberships, the method requires (at most) 13 multiplies: seven (at 650) to determine the moment arm values for the seven output membership areas, and six (at 640) for the moment arm values of the six intersections. A single division is performed (at 690) for the final center-of-gravity calculation. Therefore, using a microcontroller which requires 3 microseconds for a multiply, and 4 microseconds for a divide, the approximate time for defuzzification is 43 microseconds. If lookup tables are used to produce the moment arm values, the 13 multiplications may also be eliminated for faster processing, at the cost of increased ROM space for the needed tables.

There are certain factors bearing on the cost, utility and accuracy of the IV method which has been described, which should be born in mind by the implementor. A first factor relates to the use of a lookup table to perform integer lookup conversions, resulting in quantizing errors when the rule strength values are more finely defined. A second factor concerns the use of ITF algorithms or lookup tables which assume particular function shapes when the actual areas and center-of-area values may not in fact conform to those assumed shapes. While assumed shapes and coarse-grained approximations affect the accuracy of the output signal, evaluation tests conducted for the embodiment which has been described suggest that a maximum deviation of less than 2%, between the output value produced using the IV method and the value produced by the more elaborate piece-wise integration method, may be expected. This deviation accordingly provides a level of accuracy which is commensurate with the quantization errors to be expected due to the representation of rule strengths by a 32 integer domain.

It is to be understood that the embodiment of the invention that has been described is merely illustrative of one application of the principles of the invention. Numerous modifications may be made to the methods and apparatus described without departing from the true spirit and scope of the invention.

What is claimed is:

1. A fuzzy logic controller adapted to convert a plurality of input signal values, each representing a sensed condition in a physical system, into an output command signal for controlling an actuator, said controller comprising:

memory means for storing a plurality of rules each comprising data representing one or more input membership functions, each of said input membership functions being associated with one of said input signal values, processing means for comparing each of said input signal values with the associated one of said input membership functions of each of said rules to generate, for each of said rules, a current rule strength value, memory means for storing, for each of said rules, an output membership function consisting of data which specifies a range of values assumable by said output command signal, processing means for deriving a center-of-area value for each output membership functions for each of said rules, processing means for translating said current rule strength value for each given rule as determined by the output membership function for said given rule to generate a positive influence value indicative of an extent to which the current rule strength value for said rule should influence said output command signal, processing means for identifying rules whose output membership functions currently specify overlapping ranges of values assumable by said output command signal, processing means for deriving an intersection center-of-area value representative of each of said overlapping ranges of values, means responsive to the current rule strength value for at least one of said rules whose output membership function currently specifies at least one of said overlapping ranges of values for forming a negative influence value representative of said overlapping range, processing means for forming a total area value by summing the positive influence value for each of said rules and at least selected ones of said negative influence values, processing means for forming a total moment arm value by multiplying the positive influence value of each of said rule times the center-of-area value of the output membership function of that rule, processing means for multiplying each of said negative influence values times the intersection center-of-area value for each of said overlapping ranges to form product values, processing means for reducing said total moment arm value by the sum of said product values, and means for forming said output command signal by dividing said total moment arm value by said total area value.

2. A fuzzy logic controller as set forth in claim 1 wherein said means for generating an influence value for said given rule comprises memory means for storing a plurality of predetermined influence values for said output membership functions to form a lookup table indexed by said current rule strength value.

3. A fuzzy logic controller as set forth in claim 2 further including memory means for storing a second lookup table indexed by said current rule strength value, said second lookup table storing each total moment arm value.

* * * * *